US011500066B2

(12) United States Patent
Ahn et al.

(10) Patent No.: US 11,500,066 B2
(45) Date of Patent: Nov. 15, 2022

(54) LIDAR-INTEGRATED LAMP DEVICE FOR VEHICLE

(71) Applicants: Hyundai Motor Company, Seoul (KR); Kia Motors Corporation, Seoul (KR)

(72) Inventors: Byoung Suk Ahn, Gwacheon-si (KR); Seung Hyeok Chang, Suwon-si (KR); Jung Wook Lim, Seoul (KR); Ki Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 593 days.

(21) Appl. No.: 16/585,588

(22) Filed: Sep. 27, 2019

(65) Prior Publication Data
US 2020/0341122 A1    Oct. 29, 2020

(30) Foreign Application Priority Data

Apr. 23, 2019 (KR) .................. 10-2019-0047577

(51) Int. Cl.
*G01S 7/481* (2006.01)
*G02B 26/08* (2006.01)
*G02B 5/02* (2006.01)
*G02B 19/00* (2006.01)
*B60Q 1/04* (2006.01)
*B60Q 1/00* (2006.01)

(52) U.S. Cl.
CPC .......... *G01S 7/4815* (2013.01); *G01S 7/4817* (2013.01); *G02B 5/0278* (2013.01); *G02B 19/0009* (2013.01); *G02B 19/0047* (2013.01); *G02B 26/0833* (2013.01); *B60Q 1/0023* (2013.01); *B60Q 1/04* (2013.01); *G02B 2207/113* (2013.01)

(58) Field of Classification Search
CPC . G02B 26/0833; G01S 17/931; G01S 7/4817; B60Q 1/0023
See application file for complete search history.

(56) References Cited

U.S. PATENT DOCUMENTS

| 7,350,945 | B2 * | 4/2008 | Albou | G01S 17/931 |
| | | | | 362/543 |
| 9,074,877 | B2 * | 7/2015 | Sato | B60Q 11/005 |
| 9,285,477 | B1 | 3/2016 | Smith et al. | |
| 10,094,530 | B2 * | 10/2018 | Bhakta | G02B 26/0833 |
| 10,338,220 | B1 * | 7/2019 | Raring | H01S 5/0085 |
| 10,488,522 | B2 * | 11/2019 | Puente | G01S 7/4815 |
| 10,502,383 | B2 * | 12/2019 | Uchida | F21S 41/255 |
| 10,649,072 | B2 * | 5/2020 | Bozchalooi | G01S 17/931 |
| 10,766,401 | B1 * | 9/2020 | Calais | F21S 41/25 |

(Continued)

FOREIGN PATENT DOCUMENTS

| DE | 102008022795 A1 * | 11/2009 | .......... B60Q 1/0011 |
| DE | 102015219401 A1 * | 4/2017 | ............. B60Q 1/143 |

(Continued)

*Primary Examiner* — Christopher Stanford
(74) *Attorney, Agent, or Firm* — Morgan, Lewis & Bockius LLP

(57) ABSTRACT

A LiDAR-integrated lamp device for a vehicle, wherein a headlamp and a LiDAR system are mounted at the same position, such that the layout may be reduced and the number of parts may be decreased by sharing and combining parts, reducing the manufacturing cost.

12 Claims, 10 Drawing Sheets

(56) References Cited

U.S. PATENT DOCUMENTS

2013/0027951 A1\* 1/2013 Takahashi .......... G02B 19/0061
362/543
2013/0258689 A1\* 10/2013 Takahira ............... F21S 41/151
362/465

FOREIGN PATENT DOCUMENTS

| DE | 102016212213 A1 | \* | 1/2018 | |
|----|----|----|----|----|
| DE | 102017212411 A1 | \* | 1/2019 | ............ F21S 41/125 |
| DE | 102017222078 A1 | \* | 6/2019 | |
| DE | 102018204282 A1 | \* | 9/2019 | |
| JP | 2016162682 A | \* | 9/2016 | ............ F21S 41/675 |
| KR | 10-2009-0096994 A | | 9/2009 | |
| KR | 20200062820 A | \* | 6/2020 | |
| WO | WO-2014024385 A1 | \* | 2/2014 | ............ B60Q 1/0023 |
| WO | WO-2015033764 A1 | \* | 3/2015 | ............. B60Q 1/085 |
| WO | WO-2015145599 A1 | \* | 10/2015 | ............. G02B 26/10 |
| WO | WO-2017073111 A1 | \* | 5/2017 | |

\* cited by examiner

LIDAR-INTEGRATED LAMP DEVICE FOR VEHICLE

CROSS REFERENCE TO RELATED APPLICATION

The present application claims priority to Korean Patent Application No. 10-2019-0047577, filed Apr. 23, 2019, the entire contents of which is incorporated herein for all purposes by this reference.

BACKGROUND OF THE INVENTION

Field of the Invention

The present invention relates to a Light Detection and Ranging (LiDAR)-integrated lamp device for a vehicle, the device achieving the functions of a head lamp and LiDAR in the same space.

Description of Related Art

In general, vehicles are provided with lighting systems for more clearly showing objects in the front area of the vehicles in nighttime driving and for showing the driving states of the vehicles to other vehicles or people in the streets. The headlamp, which is called a headlight, is a light that lights the road which is ahead in the driving direction of a vehicle.

Furthermore, LiDAR is recently used to achieve self-driving vehicles and detects the distance between a vehicle and a target by measuring the time from transmission to reception of light by radiating a laser to the target from a sensor.

The LiDAR system is mounted at a similar position to the installation position of a headlamp in a vehicle, but are mounted at different position, so installations for the headlamp and the LiDAR system may be separately secured. Furthermore, since the headlamp and the LiDAR system are separately mounted, the installation space and the components are increased. Furthermore, when the optimum installation positions of the headlamp and the LiDAR system are the same, there is a problem that the positions may be changed even if there is a loss in function of any one thereof.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a LiDAR-integrated lamp device configured for a vehicle, the device reducing a layout by including a headlamp and a LiDAR system at the same position.

In view of the above aspect, a LiDAR-integrated lamp device configured for a vehicle may include: a first light source radiating light for a beam pattern to a front area from a vehicle; a second light source which is spaced from the first light source and radiates light for LiDAR sensing to the front area from the vehicle; a reflecting unit that receives the light for a beam pattern radiated from the first light source and the light for LiDAR sensing radiated from the second light source, and is configured to change a traveling path of light by reflecting the light for a beam pattern and the light for LiDAR sensing; a first optical unit that receives the light for a beam pattern of the first light source reflected by the reflecting unit and changes the light for a beam pattern into visible light and sends out visible light to the front area from the vehicle; a second optical unit that receives the light for LiDAR sensing of the second light source reflected by the reflecting unit and sends out the light for LiDAR sensing to the front area from the vehicle; and a light-receiving unit that is configured to receive the light for LiDAR sensing which is reflected and returned by an object existing ahead of the vehicle after being radiated to the front area from the vehicle through the second optical unit and changes the light for the LiDAR sensing into an electrical signal.

The first light source may be mounted at a side of the reflecting unit, and the second light source may be spaced at a first angle over or under a first connection line of connecting the first light source and the reflecting unit.

The first optical unit may be mounted ahead of the first light source, and the second optical unit may be spaced apart at the first angle from a second connection line of connecting the first light source and the first optical unit.

When the second light source is mounted higher than the first light source, the second optical unit may be mounted at an opposite lower position, and when the second light source is mounted lower than the first light source, the second optical unit may be positioned at an opposite upper position.

The second optical unit may include: a second reflector that sends the light for LiDAR sensing to the front area from the vehicle by having a reflecting surface into which the light for LiDAR sensing reflected by the reflecting unit travels and which reflects the light for LiDAR sensing; and a second divergent lens that diverts the light reflected by the second reflector.

A reflecting surface angle of the second reflector may be ½ angle of the first angle.

The first optical unit may include a condenser that condenses the light for a beam pattern, a first divergent lens that diverts the light for a beam pattern, a fluorescent body that changes the color of the light for a beam pattern, and an imaging lens that forms and sends out a beam pattern.

The fluorescent body may have a plurality of opaque walls extending straight and spaced from each other in a cross-section of the fluorescent body.

The second light source may be spaced apart at a second angle ahead of or behind the first light source such that a central axis of the light for a beam pattern reflected by the reflecting unit and a central axis of the light for LiDAR sensing reflected by the reflecting unit make the second angle.

The second light source may be mounted at a side of the reflecting unit, and the first light source may be spaced at a first angle over or under a third connection line of the second light source and the reflecting unit.

The second optical unit may be mounted ahead of the second light source, and the first optical unit may be spaced apart at the first angle from a fourth connection line of connecting the second light source and the second optical unit.

The first optical unit may include a first reflector that receives the light for a beam pattern reflected by the reflecting unit and has a reflecting surface to reflect the light for a beam pattern, a first divergent lens that diverts the light for a beam pattern, a fluorescent body that changes the color of the light for a beam pattern, and an imaging lens that forms and sends a beam pattern to the outside.

The second optical unit may include a plurality of second divergent lenses that diverts the light for LiDAR sensing reflected by the reflecting unit, and the second divergent lenses may include a first lens that horizontally diverts the light for LiDAR sensing and a second lens that vertically diverts the light for LiDAR sensing.

The reflecting unit may be a Digital Micro-mirror Device (DMD) including a plurality of fine reflecting mirrors which is switched on and off in a response to input driving signals and changes in angle, changing a path of incident light.

According to the LiDAR-integrated lamp device configured for a vehicle which has the structure described above, the position of a headlamp and the position of a LiDAR system are the same, so that the layout may be reduced and the number of portions may be decreased by sharing and combining parts, reducing the manufacturing cost.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
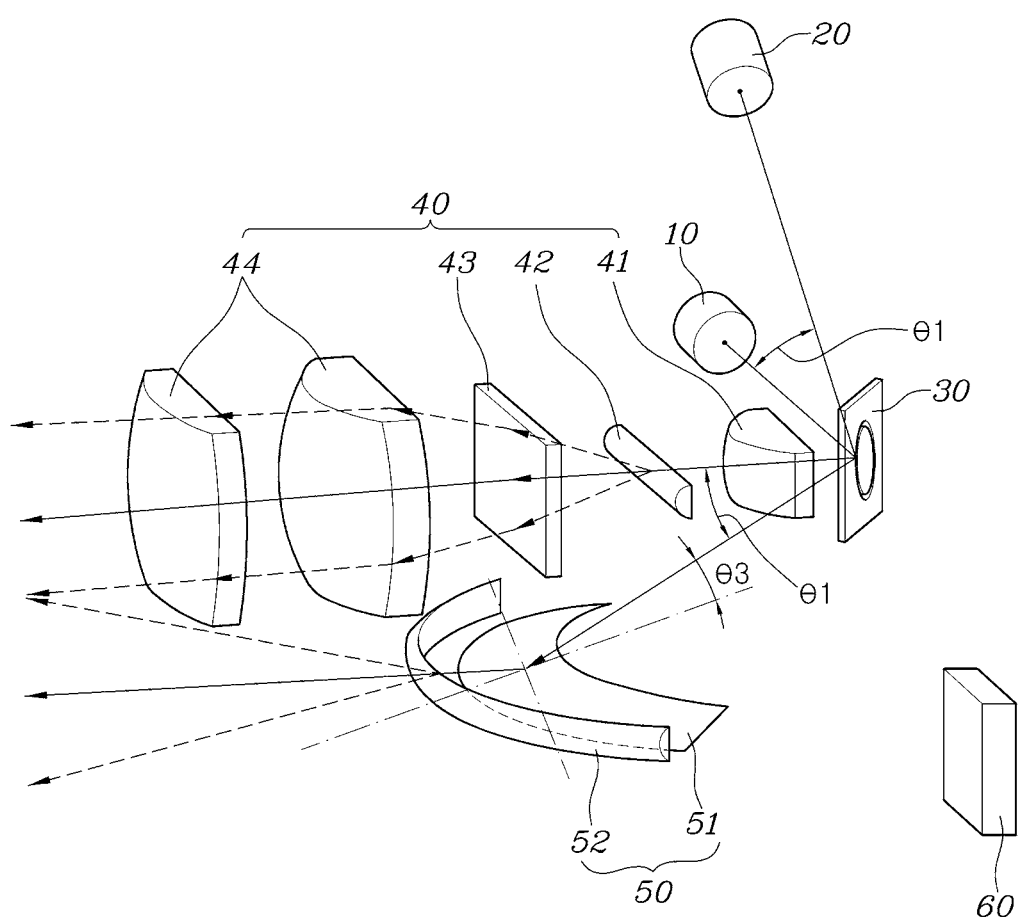
FIG. 1, FIG. 2, FIG. 3, and FIG. 4 are views showing a LiDAR-integrated lamp device configured for a vehicle according to various exemplary embodiments of the present invention.
Figure 2:
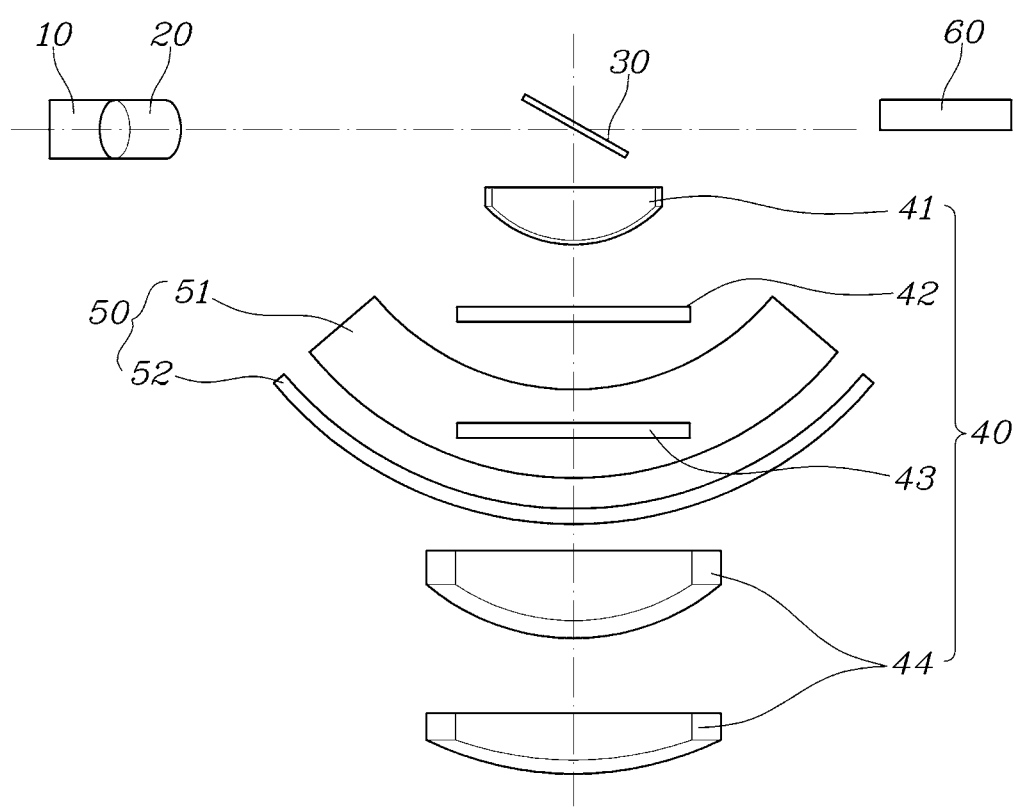
Figure 3:
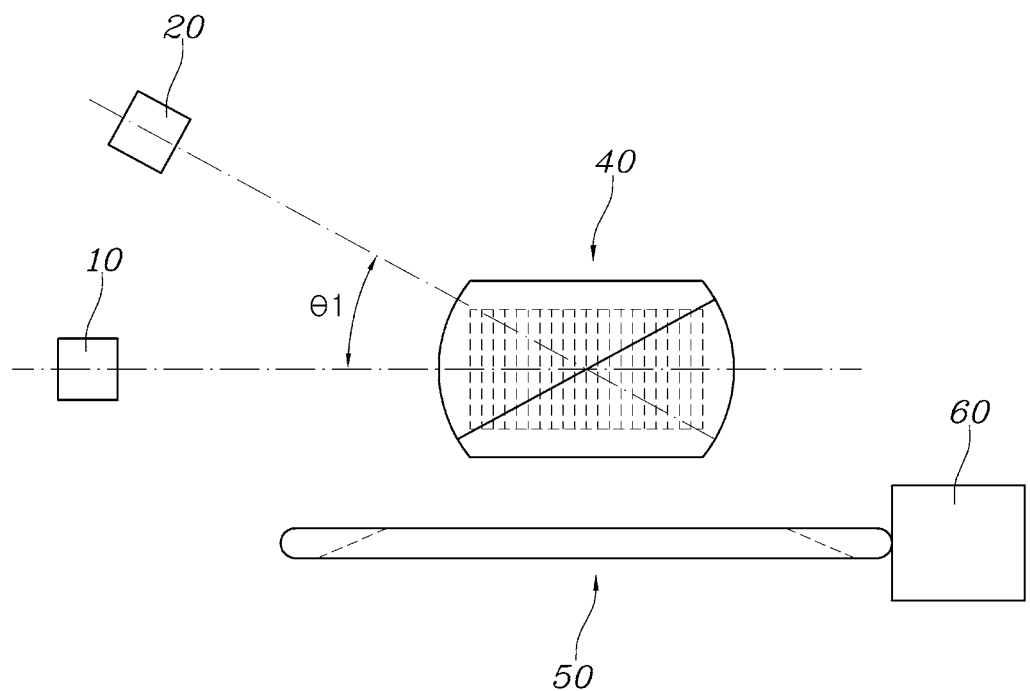
Figure 4:
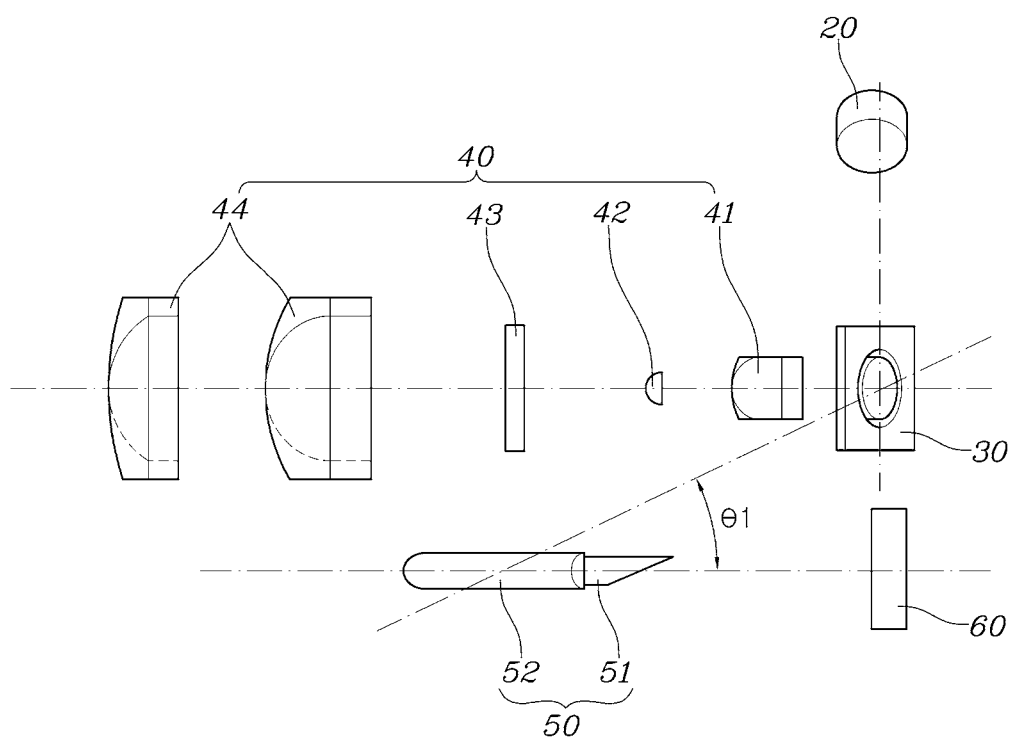

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A LiDAR-integrated lamp device configured for a vehicle according to an exemplary embodiment of the present invention is described hereafter with reference to the accompanying drawings.

Figure 5:
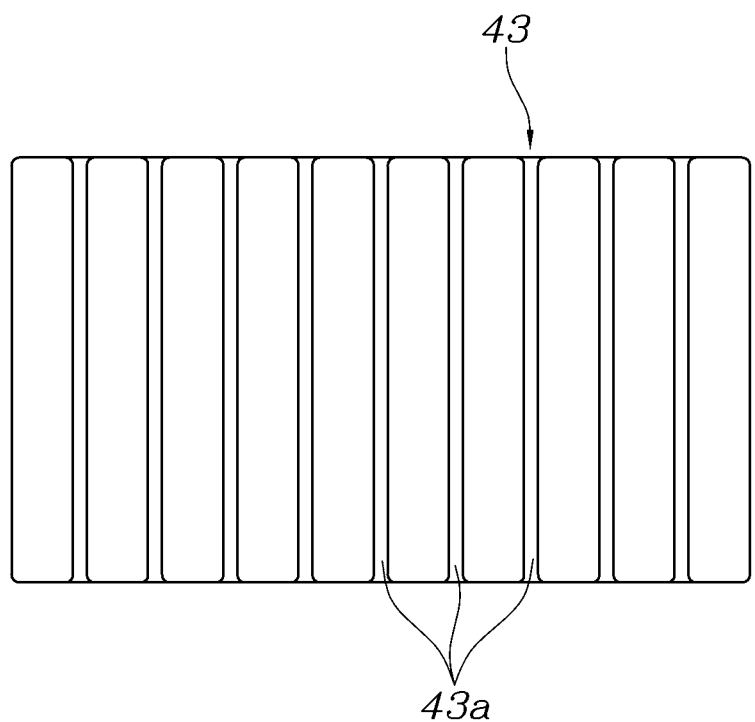
FIG. 5 and FIG. 6 are views illustrating the LiDAR-integrated lamp device configured for a vehicle according to an exemplary embodiment of the present invention.
Figure 6:
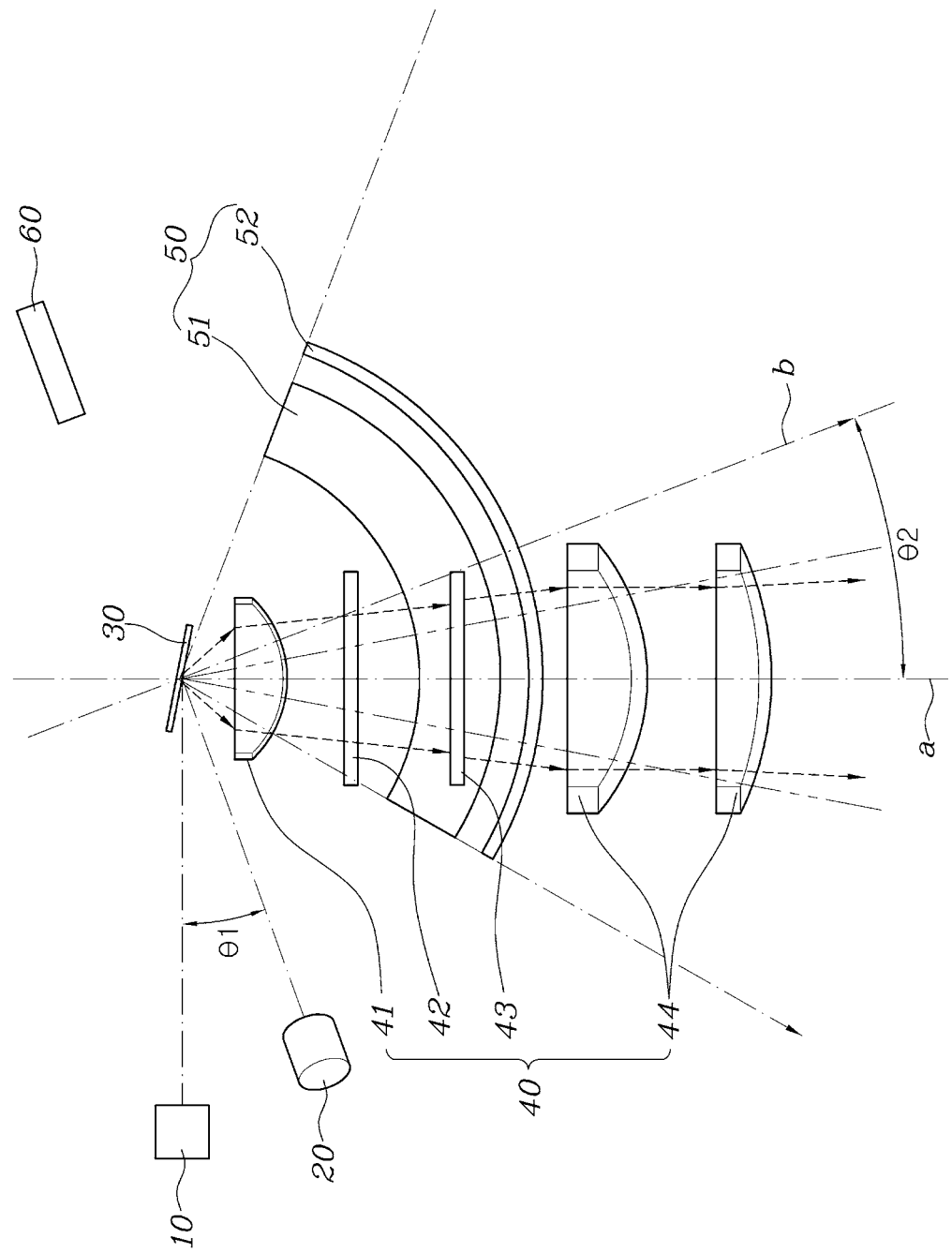
Figure 7:
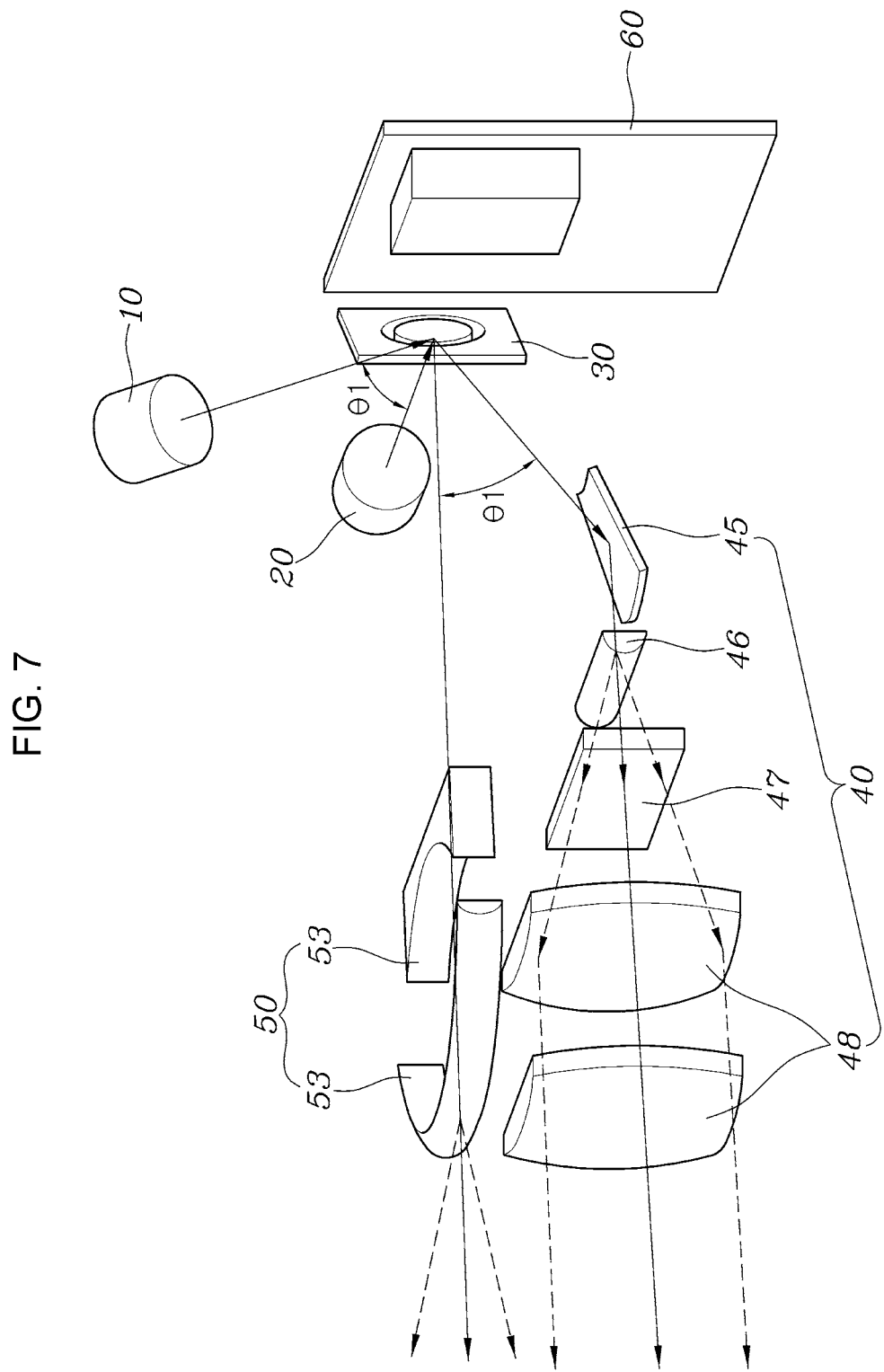
FIG. 7, FIG. 8, FIG. 9 and FIG. 10 are views showing a LiDAR-integrated lamp device configured for a vehicle according to various exemplary embodiments of the present invention.
Figure 8:
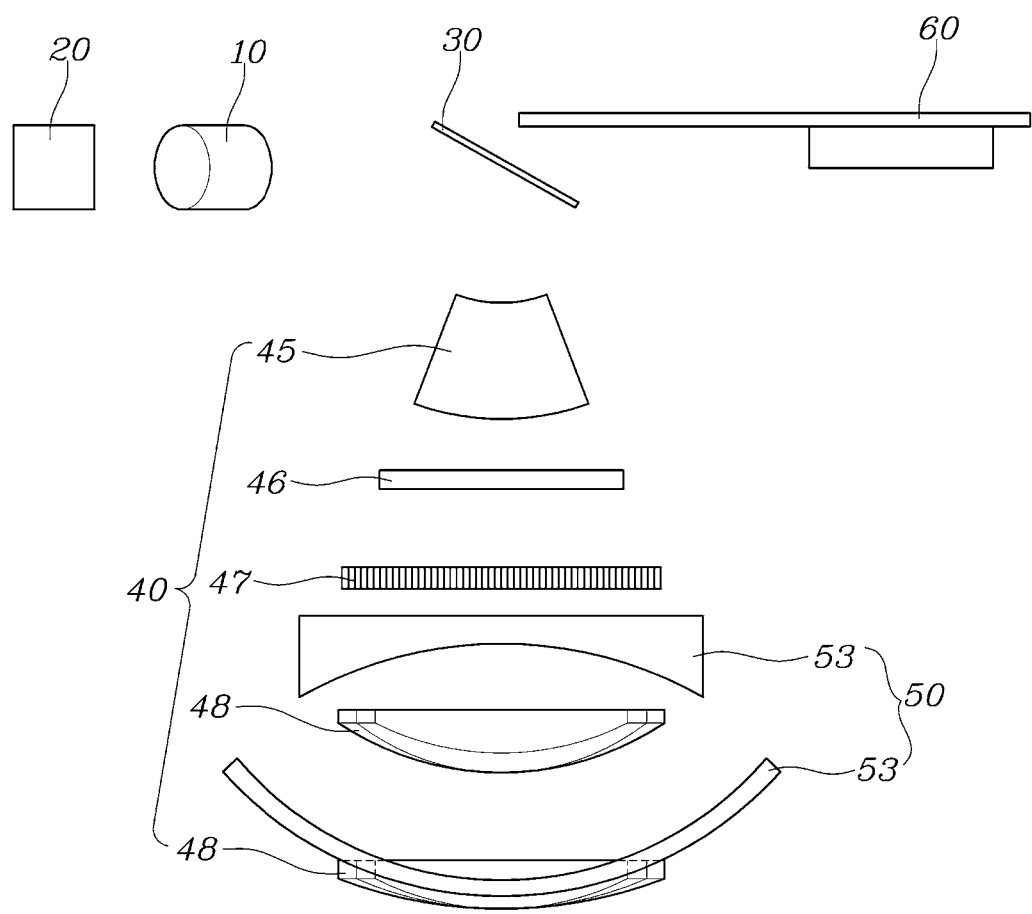
Figure 9:
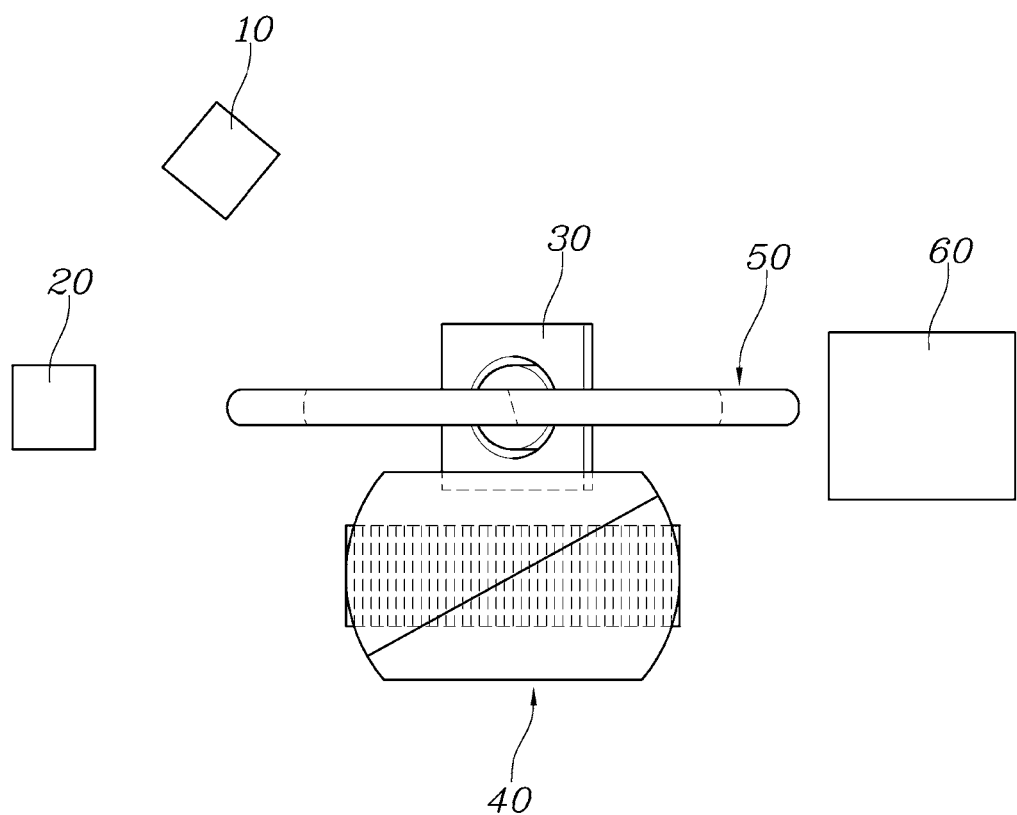
Figure 10:
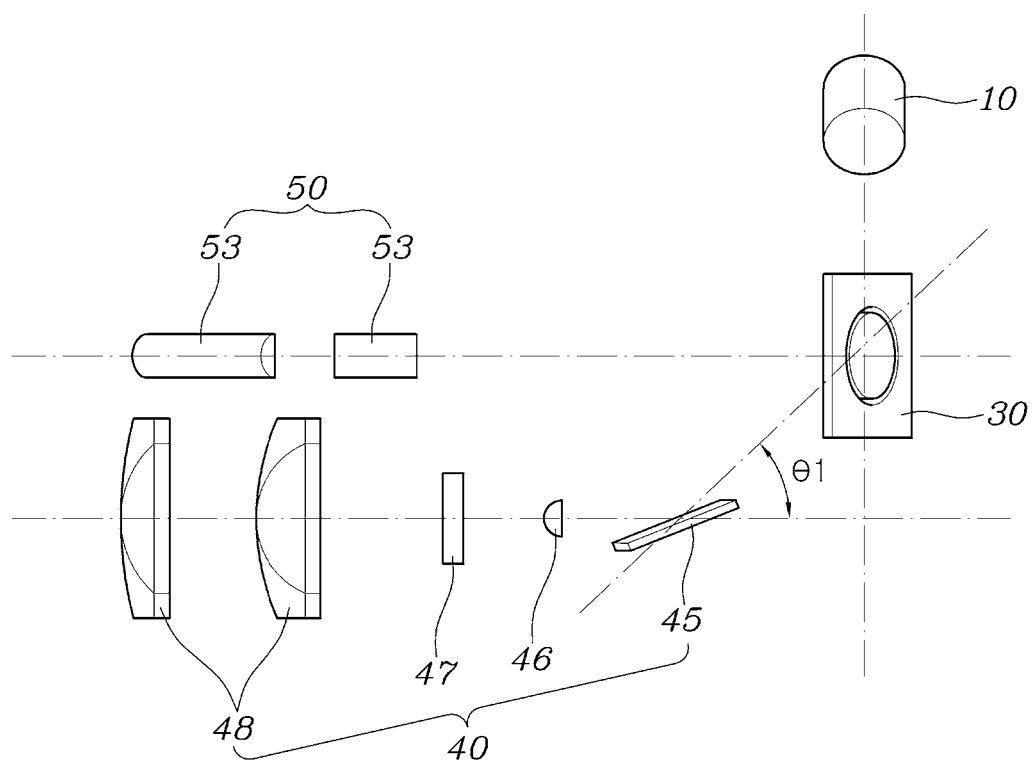

FIG. 1, FIG. 2, FIG. 3, and FIG. 4 are views showing a LiDAR-integrated lamp device configured for a vehicle according to various exemplary embodiments of the present invention, FIG. 5 and FIG. 6 are views illustrating the LiDAR-integrated lamp device configured for a vehicle according to an exemplary embodiment of the present invention, and FIG. 7, FIG. 8, FIG. 9 and FIG. 10 are views showing a LiDAR-integrated lamp device configured for a vehicle according to various exemplary embodiments of the present invention.

A LiDAR-integrated lamp device according to an exemplary embodiment of the present invention, as shown in FIG. 1, includes: a first light source 10 that radiates light for a beam pattern to the front area from a vehicle; a second light source 20 which is spaced from the first light source 10 and radiates light for LiDAR sensing to the front area from the vehicle; a reflecting unit 30 that receives the light for a beam pattern radiated from the first light source 10 and the light for LiDAR sensing radiated from the second light source 20, and changes the traveling path by reflecting the light for a beam pattern and the light for LiDAR sensing; a first optical unit 40 that receives the light for a beam pattern of the first light source 10 reflected by the reflecting unit 30 and changes the light for a beam pattern into visible light and sends out visible light to the front area from the vehicle; a second optical unit 50 that receives the light for LiDAR sensing of the second light source 20 reflected by the reflecting unit 30 and sends out the light for LiDAR sensing to the front area from the vehicle; and a light-receiving unit 60 that receives the light for LiDAR sensing which is reflected and returned by an object existing ahead of the vehicle after being radiated to the front area from the vehicle through the second optical unit 50 and changes the light for the LiDAR sensing into an electrical signal.

As described above, the device of the present invention includes the first light source 10, the second light source 20, the reflecting unit 30, the first optical unit 40, the second optical unit 50, and the light-receiving unit 60 and these components are mounted in one installation space and achieve the functions of a headlamp and LiDAR.

To the present end, the first light source 10 radiates a laser of which the laser wavelength band is a visible light wavelength band which may be visually seen, so light for a beam pattern may be projected to the road on which the vehicle is located, and the second light source 20 radiates infrared light of which the laser wavelength band is 905 nm wavelength band, so light for LiDAR sensing for sensing between the subjective vehicle and an object is radiated.

The light for a beam pattern and the light for LiDAR sensing radiated from the first light source 10 and the second light source 20 travels into the reflecting unit 30. The reflecting unit 30 may be a Digital Micro-mirror Device (DMD) including a plurality of fine reflecting mirrors which is switched on and off in a response to input driving signals and changes in angle, changing a path of incident light. That is, the angles of the fine reflecting mirrors are changed when the reflecting unit 30 is turned on and off, so it is possible to change the traveling paths of the light for a beam pattern and the light for LiDAR sensing and the angles of the fine reflecting mirrors may be controlled by a motor. Accordingly, the traveling paths of the light for a beam pattern and the light for LiDAR sensing radiated from the first light source 10 and the second light source 20 are changed in accordance with the angles of the fine reflecting mirrors of the reflecting unit 30, so that the light may be moved as much as the angles of the fine reflecting mirrors and then travel.

Accordingly, the light for a beam pattern of the first light source 10 reflected by the reflecting unit 30 is sent out to the front area from the vehicle through the first optical unit 40 and the light for LiDAR sensing of the second light source 20 is sent out to the front area from the vehicle through the second optical unit 50. The light for a beam pattern of the first light source 10 is changed into visible light through the first optical unit 40 to light the surface of a road and the light for LiDAR sensing of the second light source 20 is sent to the front area from the vehicle through the second optical unit 50 and then reflected and returned by an object in the front area from the vehicle. The light for LiDAR sensing reflected and returned by an object is received by the light-receiving unit 60 and changed into an electrical signal to be used measure the distance between the vehicle and the object etc. The light-receiving unit 60 may be a scanner for recognizing light for LiDAR sensing and can detect light for LiDAR sensing through a photodiode and change the light for the LiDAR sensing into an electrical signal.

As described above, according to an exemplary embodiment of the present invention, a LiDAR system is also mounted in the space where a headlamp is mounted in a vehicle, so that the separate space for the LiDAR system is reduced and the number of parts is also decreased, whereby the manufacturing cost is reduced.

The present invention may be achieved in various embodiments, depending on the positions where the first light source 10 and the second light source 20 are mounted with respect to the reflecting unit 30.

As various exemplary embodiments of the present invention, as shown in FIG. 1, FIG. 2, FIG. 3, and FIG. 4, the first light source 10 may be mounted at a side of the reflecting unit 30 and the second light source 20 may be spaced at a first angle θ1 over or under a connection line of the first light source 10 and the reflecting unit 30. Since the first light source 10 and the second light source 20 are spaced from the first angle θ1 from each other, the traveling paths of the light for a beam pattern and the light for LiDAR sensing that are moved by the reflecting unit 30 may be discriminated. The first angle θ1 may be set in consideration of the interference between parts that guide the traveling paths of the light for a beam pattern and the light for LiDAR sensing. Accordingly, the light for a beam pattern of the first light source 10 travels forward when it is reflected by the reflecting unit 30 and the light for LiDAR sensing of the second light source 20 travels upward or downward at the first angle θ1 when it is reflected by the reflecting unit 30.

The first optical unit 40 may be mounted ahead of the first light source 10 and the second optical unit 50 may be spaced apart at the first angle θ1 from a connection line of the first light source 10 and the first optical unit 40. Furthermore, when the second light source 20 is mounted higher than the first light source 10, the second optical unit 50 may be mounted at an opposite lower position, and when the second light source 20 is mounted lower than the first light source 10, the second optical unit 50 may be positioned at an opposite upper position.

That is, since the first light source 10 is mounted at a side of the reflecting unit 30 and the light for a beam pattern travels forward when it is reflected by the reflecting unit 30, the first optical unit 40 is mounted ahead of the first light source 10.

Since the second light source 20 is spaced from the first angle θ1 from the connection line of the first light source 10 and the reflecting unit 30, the light for LiDAR sensing travels upward or downward at the first angle θ1 after being reflected by the reflecting unit 30. Accordingly, the second optical unit 50 is spaced from the first angle θ1 from the connection line of the first light source 10 and the first optical unit 40, the second light source 20 is mounted higher or lower than the reflecting unit 30, and the second optical unit 50 is mounted at the opposite side, that is, an upper position or a lower position, so that the second optical unit 50 may be mounted on the traveling path of the light for LiDAR sensing.

Accordingly, even though the light for a beam pattern of the first light source 10 and the light for LiDAR sensing of the second light source 20 are moved to different traveling paths by the reflecting unit 30, the light for a beam pattern may be sent to the first optical unit 40 and the front area from the vehicle and the light for LiDAR sensing can be sent to the second optical unit 50 and the front area from the vehicle.

Meanwhile, the second optical unit 50 may include: a second reflector 51 that sends the light for LiDAR sensing to the front area from the vehicle by having a reflecting surface into which the light for LiDAR sensing reflected by the reflecting unit 30 travels and which reflects the light for LiDAR sensing; and a second divergent lens 52 that diverts the light reflected by the second reflector 51.

The second optical unit 50 may include the second reflector 51 and the second divergent lens 52 in the various exemplary embodiments. That is, since the light for LiDAR sensing radiated from the second light source 20 travels upward or downward at the first angle θ1 after being reflected by the reflecting unit 30, the second reflector 51 reflects the light for LiDAR sensing to the front area from the vehicle. The light for LiDAR sensing of the second light source 20 is enlarged in horizontal angle by the reflecting unit, reflected to the second divergent lens 52 by the second reflector 51, and vertically diverted by the second diffusion divergent lens 52, whereby it may be projected toward the front area from the vehicle.

The reflecting surface angle of the second reflector 51 may be ½ angle θ3 of the first angle θ1. Furthermore, the reflecting surface of the second reflector 51 may have an area corresponding to the radius according to the rotation angle of the fine reflecting mirrors of the reflecting unit 30.

As described above, since the reflecting surface of the second reflector 51 has the ½ angle θ3 of the first angle θ1, when the light for LiDAR sensing is reflected by the reflecting unit 30 and travels into the second reflector 51 at the first angle θ1, the traveling path of the light for LiDAR sensing can go to the front area from the vehicle. Furthermore, since the reflecting surface area of the second reflector 51 corresponds to the rotation angle of the fine reflecting mirrors, the light for LiDAR sensing reflected by the reflecting unit 30 is reflected by the second reflector 51, so deterioration of optical efficiency is prevented.

On the other hand, the first optical unit 40 may include a condenser 41 that condenses the light for a beam pattern, a first divergent lens 42 that diverts the light for a beam pattern, a fluorescent body 43 that changes the color of the light for a beam pattern, and an imaging lens 44 that forms and sends out a beam pattern.

Accordingly, the light for a beam pattern passing through the first optical unit 40 is changed in horizontal directional angle by the condenser 41 and is vertically diverted by the first divergent lens 42, and the light for a beam pattern diverted horizontally/vertically is changed into a predetermined color by the fluorescent body 43. The light for a beam pattern of the first light source 10 may be a blue laser to the changed into white light when it passes through the fluorescent body 43. Furthermore, the fluorescent body 43, as shown in FIG. 5, may have a plurality of opaque separation walls 43a extending straight and spaced from each other in the cross-section, so light spread of the light for a beam pattern passing through the fluorescent body 43 is prevented by the structure of the opaque separation walls 43a, whereby a desired beam pattern may be formed. The light for a beam pattern of which the color has been changed through the fluorescent body 43 is projected to a road surface while forming a beam pattern through the imaging lens 44.

On the other hand, as shown in FIG. 6, since the second light source 20 may be spaced apart at a second angle θ2 ahead of or behind the first light source 10 such that the central axis a of the light for a beam pattern reflected by the reflecting unit 30 and the central axis b of the light for LiDAR sensing reflected by the reflecting unit 30 make the second angle θ2.

That is, the central axis a of the light for a beam pattern of the first light source 10 goes forward, so that the traveling path of the light goes forward thereof. Furthermore, the central axis b of the light for LiDAR sensing of the second light source 20 is spaced the second angle θ2 laterally from the central axis a of the light for a beam pattern, so that the traveling path of the light goes laterally forward thereof.

Accordingly, when the device is mounted on a side of a vehicle, the light for a beam pattern of the first light source 10 is radiated forward from the vehicle and the light for LiDAR sensing of the second light source 20 is radiated forward and to a side, each function may be smoothly performed. Furthermore, when the device is mounted on a side of a vehicle, the LiDAR sensing range is enlarged to a side, including the front area, thus sensing objects around the vehicle may be smoothly performed.

On the other hand, as various exemplary embodiments of the present invention, as shown in FIG. 7, FIG. 8, FIG. 9 and FIG. 10, the second light source 20 may be mounted at a side of the reflecting unit 30 and the first light source 10 may be spaced at a first angle (θ1) over or under a connection line of the second light source 20 and the reflecting unit 30.

Since the first light source 10 and the second light source 20 are spaced from the first angle (θ1) from each other, the traveling paths of the light for a beam pattern and the light for LiDAR sensing that are moved by the reflecting unit 30 may be discriminated. Accordingly, the light for LiDAR sensing of the second light source 20 travels forward when it is reflected by the reflecting unit 30 and the light for a beam pattern of the first light source 10 travels upward or downward at the first angle θ1 when it is reflected by the reflecting unit 30.

The second optical unit 50 may be mounted ahead of the second light source 20 and the first optical unit 40 may be spaced at the first angle θ1 from a connection line of the second light source 20 and the second optical unit 50. Furthermore, when the first light source 10 is mounted higher than the second light source 20, the first optical unit 40 may be mounted at an opposite lower position, and when the first light source 10 is mounted lower than the second light source 20, the first optical unit 40 may be positioned at an opposite upper position.

That is, since the second light source 20 is mounted at a side of the reflecting unit 30, the light for LiDAR sensing travels forward when it is reflected by the reflecting unit 30, so that the first optical unit 40 is mounted ahead of the first light source 10.

Since the first light source 10 is spaced from the first angle θ1 from the connection line of the second light source 20 and the reflecting unit 30, the light for LiDAR sensing travels upward or downward at the first angle θ1. Accordingly, the first optical unit 40 is spaced from the first angle θ1 from the connection line of the second light source 20 and the second optical unit 50, the first light source 10 is mounted higher or lower than the reflecting unit 30, and the first optical unit 40 is mounted at the opposite side, that is, an upper position or a lower position, so that the second optical unit 50 may be mounted on the traveling path of the light for LiDAR sensing.

Accordingly, even though the light for a beam pattern of the first light source 10 and the light for LiDAR sensing of the second light source 20 are moved to different traveling paths by the reflecting unit 30, the light for a beam pattern may be sent to the first optical unit 40 and the light for LiDAR sensing may be sent to the second optical unit 50.

Meanwhile, the first optical unit 40 may include: a first reflector 45 that receives the light for a beam pattern reflected by the reflecting unit 30 and has a reflecting surface to reflect the light for a beam pattern; a first divergent lens 46 that diverts the light for a beam pattern; a fluorescent body 47 that changes the color of the light for a beam pattern; and an imaging lens 48 that forms and sends a beam pattern to the outside.

As described above, the first optical unit 40 may include the first reflector 45, the first divergent lens 46, the fluorescent body 47, and the imaging lens 48 in the various exemplary embodiments. That is, the light for a beam pattern radiated from the first light source 10 is reflected by the reflecting unit 30 with the horizontal angle enlarged, and is sent to the front area from the vehicle by the first reflector 45. The light for a beam pattern sent to the front area from the vehicle by the reflector is vertically diverted through the first divergent lens 46, and the diverted light for a beam pattern may be projected to a road surface while forming a beam pattern through the imaging lens after being changed to a predetermined color by the fluorescent body 47.

Meanwhile, the second optical unit 50 includes a plurality of second divergent lenses 53 that diverts the light for LiDAR sensing reflected by the reflecting unit 30 and the divergent lenses 53 may include a first lens that horizontally diverts the light for LiDAR sensing and a second lens that vertically diverts the light for LiDAR sensing.

Accordingly, the light for LiDAR sensing of the second light source 20 is primarily enlarged in horizontal angle by the reflecting unit 30 and secondarily enlarged in horizontal view angle by the lens that horizontally diverts the light. Thereafter, the vertical view angle is enlarged by the lens that vertically diverts light, the light for LiDAR sensing can smoothly reach an object existing ahead of the vehicle.

According to the LiDAR-integrated lamp device configured for a vehicle which has the structure described above, the position of a headlamp and the position of a LiDAR system are the same, so that the layout may be reduced and the number of parts may be decreased by sharing and combining parts, reducing the manufacturing cost.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Light Detection and Ranging (LiDAR)-integrated lamp device for a vehicle, the LiDAR-integrated lamp device comprising:
    a first light source radiating light for a beam pattern to a front area from a vehicle;
    a second light source spaced from the first light source and radiating light for LiDAR sensing to the front area from the vehicle;
    a reflecting unit that receives the light for the beam pattern radiated from the first light source and the light for the LiDAR sensing radiated from the second light source, and is configured to change a traveling path of light by reflecting the light for the beam pattern and the light for the LiDAR sensing;
    a first optical unit that receives the light for the beam pattern of the first light source reflected by the reflecting unit and is configured to change the light for the beam pattern into visible light and send out the visible light to the front area from the vehicle;
    a second optical unit that receives the light for the LiDAR sensing of the second light source reflected by the reflecting unit and sends out the light for the LiDAR sensing to the front area from the vehicle; and
    a light-receiving unit that is configured to receive the light for the LiDAR sensing which is reflected and returned by an object existing ahead of the vehicle after being radiated to the front area from the vehicle through the second optical unit and is configured to change the light for the LiDAR sensing into an electrical signal,
    wherein the first light source is mounted at a side of the reflecting unit,
    wherein the second light source is spaced at a first angle over or under a first connection line of connecting the first light source and the reflecting unit, and
    wherein the second optical unit includes:
        a second reflector including a reflecting surface and sends the light for the LiDAR sensing to the front area from the vehicle by the reflecting surface into which the light for the LiDAR sensing reflected by the reflecting unit travels and which reflects the light for the LiDAR sensing; and
        a second divergent lens that diverts the light reflected by the second reflector, wherein the second reflector and the second divergent lens are mounted in series in a predetermined direction.

2. The LiDAR-integrated lamp device of claim 1,
    wherein the first optical unit is mounted ahead of the first light source, and
    wherein the second optical unit is spaced apart at the first angle from a second connection line of connecting the first light source and the first optical unit.

3. The LiDAR-integrated lamp device of claim 1,
    wherein the second light source is mounted higher than the first light source and the second optical unit is mounted at an opposite lower position thereof.

4. The LiDAR-integrated lamp device of claim 1,
    wherein the second light source is mounted lower than the first light source and the second optical unit is positioned at an opposite upper position thereof.

5. The LiDAR-integrated lamp device of claim 1,
    wherein a reflecting surface angle of the second reflector is half angle of the first angle.

6. The LiDAR-integrated lamp device of claim 1, wherein the first optical unit includes:
    a condenser that condenses the light for the beam pattern;
    a first divergent lens that diverts the light for the beam pattern;
    a fluorescent body that changes a color of the light for the beam pattern; and
    an imaging lens that forms and sends out the beam pattern,
    wherein the condenser, the first divergent lens, the fluorescent body and the imaging lens are mounted in series in a predetermined direction.

7. The LiDAR-integrated lamp device of claim 6,
    wherein the fluorescent body has a plurality of opaque walls extending straight and spaced from each other in a cross-section of the fluorescent body.

8. The LiDAR-integrated lamp device of claim 1,
    wherein the second light source is spaced apart at a second angle ahead of or behind the first light source so that a central axis of the light for the beam pattern reflected by the reflecting unit and a central axis of the light for the LiDAR sensing reflected by the reflecting unit make the second angle.

9. The LiDAR-integrated lamp device of claim 1,
    wherein the reflecting unit is a Digital Micro-mirror Device (DMD) including a plurality of reflecting mirrors which is switched on and off in a response to input driving signals and changes in angle thereof, to change a path of incident light.

10. A Light Detection and Ranging (LiDAR)-integrated lamp device for a vehicle, the LiDAR-integrated lamp device comprising:
    a first light source radiating light for a beam pattern to a front area from a vehicle;
    a second light source spaced from the first light source and radiating light for LiDAR sensing to the front area from the vehicle;
    a reflecting unit that receives the light for the beam pattern radiated from the first light source and the light for the LiDAR sensing radiated from the second light source, and is configured to change a traveling path of light by reflecting the light for the beam pattern and the light for the LiDAR sensing;
    a first optical unit that receives the light for the beam pattern of the first light source reflected by the reflecting unit and is configured to change the light for the beam pattern into visible light and send out the visible light to the front area from the vehicle;
    a second optical unit that receives the light for the LiDAR sensing of the second light source reflected by the reflecting unit and sends out the light for the LiDAR sensing to the front area from the vehicle; and
    a light-receiving unit that is configured to receive the light for the LiDAR sensing which is reflected and returned by an object existing ahead of the vehicle after being radiated to the front area from the vehicle through the second optical unit and is configured to change the light for the LiDAR sensing into an electrical signal,
    wherein the second light source is mounted at a side of the reflecting unit, and wherein the first light source is spaced at a first angle over or under a third connection line of the second light source and the reflecting unit, wherein the second optical unit includes a plurality of second divergent lenses that diverts the light for the LiDAR sensing reflected by the reflecting unit, and wherein the second divergent lenses include a first lens that horizontally diverts the light for the LiDAR sensing and a second lens that vertically diverts the light for the LiDAR sensing.

11. The LiDAR-integrated lamp device of claim 10, wherein the second optical unit is mounted ahead of the second light source, and wherein the first optical unit is spaced apart at the first angle from a fourth connection line of connecting the second light source and the second optical unit.

12. The LiDAR-integrated lamp device of claim 10, wherein the first optical unit includes:

a first reflector that receives the light for the beam pattern reflected by the reflecting unit and has a reflecting surface to reflect the light for the beam pattern;

a first divergent lens that diverts the light for the beam pattern;

a fluorescent body that changes a color of the light for the beam pattern; and an imaging lens that forms and sends the beam pattern to the outside, wherein the first reflector, the first divergent lens, the fluorescent body, and the imaging lens are mounted in series in a predetermined direction.

* * * * *